United States Patent
Matsuoka

(10) Patent No.: US 12,210,035 B2
(45) Date of Patent: Jan. 28, 2025

(54) INERTIAL SENSOR DEVICE AND SENSOR MODULE

(71) Applicant: SEIKO EPSON CORPORATION, Tokyo (JP)

(72) Inventor: Hiroki Matsuoka, Fujimi (JP)

(73) Assignee: SEIKO EPSON CORPORATION (JP)

( * ) Notice: Subject to any disclaimer, the term of this patent is extended or adjusted under 35 U.S.C. 154(b) by 0 days.

(21) Appl. No.: 17/955,597

(22) Filed: Sep. 29, 2022

(65) Prior Publication Data

US 2023/0100231 A1   Mar. 30, 2023

(30) Foreign Application Priority Data

Sep. 30, 2021  (JP) ................. 2021-160660

(51) Int. Cl.
| | |
|---|---|
| *G01P 15/18* | (2013.01) |
| *G01C 21/00* | (2006.01) |
| *G01C 21/16* | (2006.01) |
| *G01C 25/00* | (2006.01) |
| *G01P 1/02* | (2006.01) |

(52) U.S. Cl.
CPC .............. *G01P 15/18* (2013.01); *G01C 21/00* (2013.01); *G01C 21/183* (2020.08); *G01C 25/005* (2013.01); *G01P 1/02* (2013.01)

(58) Field of Classification Search
CPC . G01P 15/18; G01P 21/00; G01P 1/02; G01C 21/186; G01C 25/005; G01C 21/183
See application file for complete search history.

(56) References Cited

U.S. PATENT DOCUMENTS

| | | | |
|---|---|---|---|
| 2011/0218753 A1* | 9/2011 | Udagawa | G16Z 99/00 |
| | | | 702/94 |
| 2017/0115116 A1* | 4/2017 | Ide | G01C 19/5635 |
| 2017/0199217 A1* | 7/2017 | Naruse | G01P 15/0802 |
| 2019/0283732 A1* | 9/2019 | Otani | G01C 9/06 |
| 2019/0285663 A1* | 9/2019 | Chino | G01C 21/183 |
| 2020/0033825 A1* | 1/2020 | Otani | G05D 1/0088 |
| 2021/0123736 A1* | 4/2021 | Ozawa | G01C 19/5649 |
| 2021/0270686 A1* | 9/2021 | Rogers | G01L 5/0052 |
| 2022/0155337 A1* | 5/2022 | Kuroda | G01P 15/18 |

(Continued)

FOREIGN PATENT DOCUMENTS

JP  2016-031358 A  3/2016

*Primary Examiner* — Helen C Kwok
(74) *Attorney, Agent, or Firm* — Harness, Dickey & Pierce, P.L.C.

(57) ABSTRACT

An inertial sensor device includes a first interface, a second sensor, a second interface, a host interface, and a processing circuit. The first interface is an interface for a first sensor configured to detect a first physical quantity in a first detection axis, a second physical quantity in a second detection axis, and a third physical quantity in a third detection axis. The second sensor is configured to detect the physical quantity in the third detection axis as a high-accuracy third physical quantity with a higher accuracy than the first sensor. The processing circuit is configured to output the first physical quantity and the second physical quantity to a host via the host interface, and output the high-accuracy third physical quantity instead of the third physical quantity to the host via the host interface.

4 Claims, 14 Drawing Sheets

(56) References Cited

U.S. PATENT DOCUMENTS

| | | | |
|---|---|---|---|
| 2023/0078589 A1* | 3/2023 | Sakuma | G01P 15/18 |
| | | | 73/510 |
| 2023/0079036 A1* | 3/2023 | Ozawa | G01P 15/0802 |
| | | | 73/514.01 |
| 2023/0099306 A1* | 3/2023 | Watanabe | G01P 15/18 |
| | | | 73/488 |
| 2023/0099359 A1* | 3/2023 | Mitsunaga | G01C 19/5776 |
| | | | 73/514.02 |
| 2023/0125187 A1* | 4/2023 | Nishio | G01C 19/56 |
| | | | 257/787 |

* cited by examiner

INERTIAL SENSOR DEVICE AND SENSOR MODULE

The present application is based on, and claims priority from JP Application Serial Number 2021-160660, filed Sep. 30, 2021, the disclosure of which is hereby incorporated by reference herein in its entirety.

BACKGROUND

1. Technical Field

The present disclosure relates to an inertial sensor device, a sensor module, and the like.

2. Related Art

JP-A-2016-031358 describes a configuration in which a three-axis angular velocity sensor and a three-axis acceleration sensor in each of which a movable member and the like formed of silicon is formed, are formed at a substrate of one host device.

When more accurate detection data than those detected by these sensors is required, a separate sensor is required to be added. However, when the separate sensor is further coupled to the host device, adjustment performed on a host device side with the addition of the sensor, such as changing an interface specification of the host device becomes complicated.

SUMMARY

An aspect of the present disclosure relates to an inertial sensor device. The inertial sensor device includes: a first interface that is an interface for a first sensor configured to detect a first physical quantity in a first detection axis, a second physical quantity in a second detection axis, and a third physical quantity in a third detection axis; a second sensor configured to detect the physical quantity in the third detection axis as a high-accuracy third physical quantity with a higher accuracy than the first sensor; a second interface that is an interface for the second sensor; a host interface that is an interface for a host; and a processing circuit, and the processing circuit is configured to output the first physical quantity and the second physical quantity to the host via the host interface, and output the high-accuracy third physical quantity instead of the third physical quantity to the host via the host interface.

Another aspect of the present disclosure relates to a sensor module including the inertial sensor device described above and the first sensor described above.

DESCRIPTION OF EXEMPLARY EMBODIMENTS

Hereinafter, a preferred embodiment of the present disclosure will be described in detail. The present embodiment to be described below does not unduly limit contents described in the claims, and not all configurations described in the present embodiment are necessarily essential constituent elements.

Figure 1:
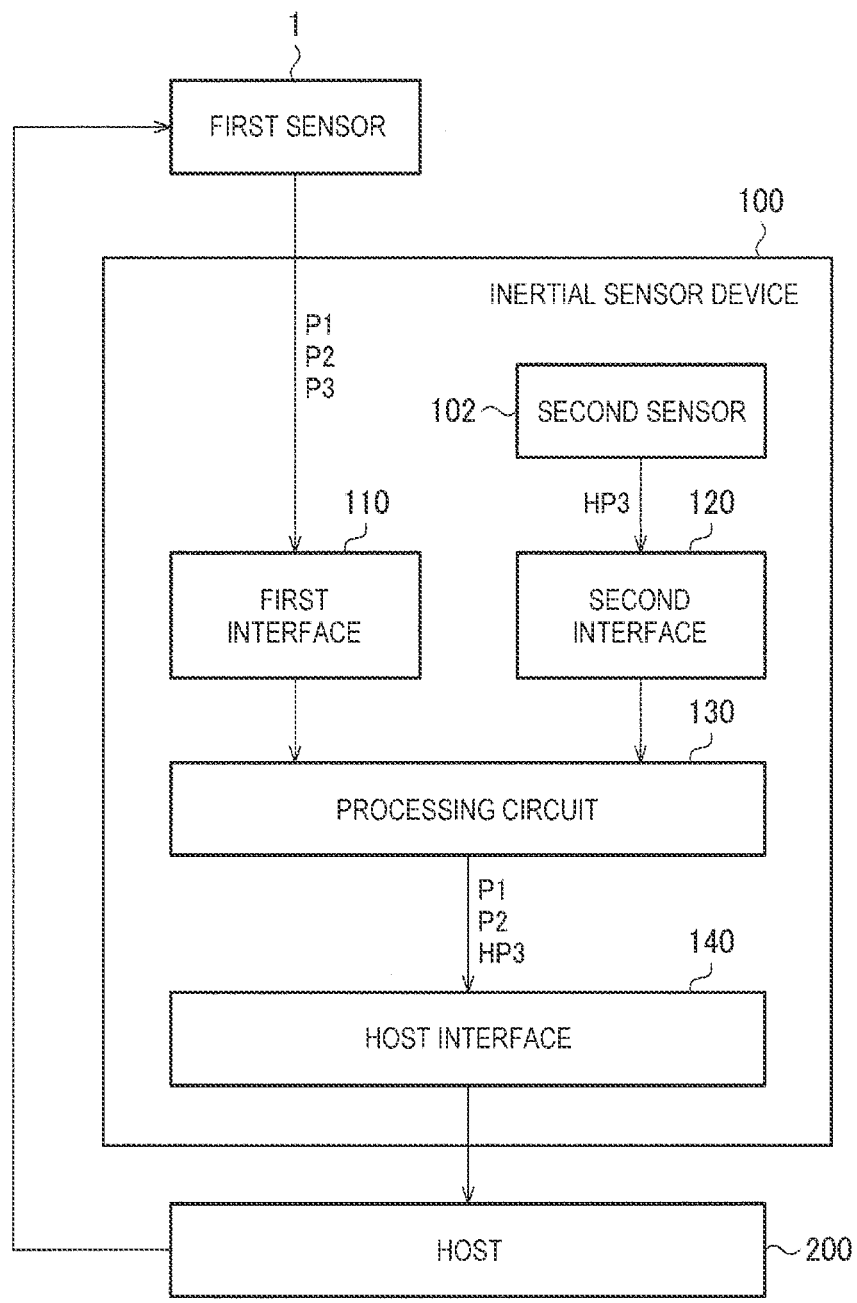
FIG. 1 is a block diagram illustrating a configuration example according to an embodiment.

FIG. 1 is a block diagram illustrating a configuration example of an inertial sensor device 100 according to the present embodiment. The inertial sensor device 100 according to the present embodiment includes a second sensor 102, a first interface 110 that is an interface for a first sensor 1, a second interface 120, a processing circuit 130, and a host interface 140 that is an interface for a host 200. The inertial sensor device 100 according to the present embodiment constitutes a predetermined semiconductor package. The predetermined semiconductor package is, for example, an insertion-mounting type dual-in-line package (DIP), or a surface-mounting type quad flat package (QFP). In the following description, the semiconductor package may be simply referred to as a package.

The first sensor 1 detects, for example, a physical quantity in an X-axis direction and outputs digital X-axis physical quantity data. The X-axis physical quantity data is digital data representing the physical quantity in the X-axis direction. In the following description, the digital data may be simply referred to as data. Further, the first sensor 1 detects, for example, a physical quantity in a Y-axis direction and outputs digital Y-axis physical quantity data, and detects a physical quantity in a Z-axis direction and outputs digital Z-axis physical quantity data. Similarly, the Y-axis physical quantity data is digital data representing the physical quantity in the Y-axis direction, and the Z-axis physical quantity data is digital data representing the physical quantity in the Z-axis direction. Here, an X axis and a Y axis are axes orthogonal to each other, and are axes in a direction orthogonal to a Z axis. That is, the first sensor 1 is a three-axis physical quantity sensor. A physical quantity is, for example, an acceleration, and may be an angular velocity or another physical quantity. For example, when the physical quantity is an acceleration, the first sensor 1 is a three-axis acceleration sensor, and can be implemented by, for example, one device which is a capacitive Si-MEMS sensor device capable of detecting accelerations in the X-axis direction, the Y-axis direction, and the Z-axis direction. The first sensor 1 is not limited thereto, and may be implemented by a frequency change type crystal acceleration sensor, a piezo resistance type acceleration sensor, or a heat detection type acceleration sensor. For example, when the physical quantity is an angular velocity, the first sensor 1 is an angular velocity sensor, and can be implemented by a Si-MEMS sensor device or the like. The angular velocity sensor is also referred to as a gyro sensor.

Although not illustrated in FIG. 1, the first sensor 1 includes a sensor element that detects the physical quantities in the axes, an analog circuit that includes an amplifier circuit that amplifies a detection signal from the sensor element, and an A/D conversion circuit that converts an analog signal from the analog circuit into digital data. Similarly, in FIGS. 2, 9, and 10 to be described later, the sensor element, the analog circuit, the A/D conversion circuit, and the like of the first sensor 1 are not illustrated. Output data of the A/D conversion circuit or digital data obtained by performing correction processing such as a temperature correction on the output data is output to the first interface 110 as the X-axis physical quantity data. One sensor element may be able to detect the physical quantities in the X-axis direction, the Y-axis direction, and the Z-axis direction, or a sensor element that detects the physical quantity in the X-axis direction, a sensor element that detects the physical quantity in the Y-axis direction, and a sensor element that detects the physical quantity in the Z-axis direction may be separately provided.

In the following description, a detection axis in a direction parallel to the X axis may be referred to as a first detection axis, a detection axis in a direction parallel to the Y axis may be referred to as a second detection axis, and a detection axis in a direction parallel to the Z axis may be referred to as a third detection axis. The X-axis physical quantity data output by the first sensor 1 may be referred to as a first physical quantity P1, the Y-axis physical quantity data output by the first sensor 1 may be referred to as a second physical quantity P2, and the Z-axis physical quantity data output by the first sensor 1 may be referred to as a third physical quantity P3. Similarly, in an example to be described later, X-axis angular velocity data may be referred to as a first angular velocity G1, Y-axis angular velocity data may be referred to as a second angular velocity G2, and Z-axis angular velocity data may be referred to as a third angular velocity G3. Similarly, X-axis acceleration data may be referred to as a first acceleration A1, Y-axis acceleration data may be referred to as a second acceleration A2, and Z-axis acceleration data may be referred to as a third acceleration A3. As described above, the first sensor 1 detects the first physical quantity P1 in the first detection axis, the second physical quantity P2 in the second detection axis, and the third physical quantity P3 in the third detection axis.

The first interface 110 is a circuit that performs interface processing related to transmission and reception of digital data to and from the first sensor 1 according to a predetermined communication method. The predetermined communication method is, for example, a predetermined serial communication method, and may be a parallel communication method. Further, the predetermined serial communication method is a synchronous serial peripheral interface (SPI), and may be an inter-integrated circuit (I2C), a universal asynchronous receiver transmitter (UART), or the like, or may be a communication method obtained by improving or modifying a part of these communication methods.

The second sensor 102 is a physical quantity sensor that can detect a physical quantity with a higher accuracy than the first sensor 1. A high accuracy means, for example, a high resolution, a high S/N, or a low error. More specifically, the fact that the physical quantity can be detected with a higher accuracy than the first sensor 1 means that a minimum unit of the physical quantity that can be detected by the second sensor 102 is smaller than a minimum unit of the physical quantity that can be detected by the first sensor 1. For example, when signal strengths output by the sensor element of the first sensor 1 and the sensor element of the second sensor 102 are the same, a ratio of a noise strength to the signal strength output by the second sensor 102 is smaller. Alternatively, a ratio of an error to the signal strength output by the sensor element of the second sensor 102 is smaller than a ratio of an error to the signal strength output by the sensor element of the first sensor 1. The second sensor 102 detects, for example, a physical quantity in the Z-axis direction, and outputs a high-accuracy third physical quantity HP3 that is highly accurate Z-axis physical quantity data. Here, the highly accurate Z-axis physical quantity data may be digital data. That is, although not illustrated in detail, the second sensor 102 may include the sensor element that detects the physical quantity in the Z axis, an analog circuit that includes an amplifier circuit that amplifies a detection signal from the sensor element, and an A/D conversion circuit that converts an analog signal from the analog circuit into digital data. The digital data of the high-accuracy third physical quantity HP3 converted in this way is output with a value of which lower bit is a reliable value as compared with the digital data of the third physical quantity P3 output from the above-described first sensor 1. When the physical quantity detected by the second sensor 102 is, for example, an angular velocity, the second sensor 102 is an angular velocity sensor, and can be implemented by, for example, a resonance frequency change type crystal angular velocity sensor that detects an angular velocity from a Coriolis force applied to a vibrating object and that is made of a crystal material. When the physical quantity detected by the second sensor 102 is, for example, an acceleration, the second sensor 102 is an acceleration sensor, and can be implemented by a frequency change type crystal acceleration sensor or the like. As described above, the second sensor 102 detects the physical quantity in the third detection axis as the high-accuracy third physical quantity HP3 with a higher accuracy than the first sensor 1.

Similarly to the first interface 110, the second interface 120 is a circuit that performs interface processing related to transmission and reception of digital data to and from the second sensor 102 according to a predetermined communication method. The predetermined communication method is as described above. The communication method followed by the second interface 120 may be the same as or different from the communication method followed by the first interface 110.

The processing circuit 130 performs processing of parts of the inertial sensor device 100. For example, the processing circuit 130 performs processing of controlling the second sensor 102 and the like. In other words, the processing circuit 130 is a controller serving as a master for the second sensor 102 when the processing circuit 130 performs digital data communication with the second sensor 102 or the like. The processing circuit 130 includes the following hardware. The hardware includes a circuit that processes the digital signal, and may further include a circuit that processes the analog signal. For example, the hardware may include one or more circuit devices mounted on a circuit substrate and one or more circuit elements. The one or more circuit devices are, for example, an integrated circuits (IC) and a field-programmable gate arrays (FPGA). The one or more circuit elements are, for example, resistors and capacitors. The processing circuit 130 is implemented by providing at least one processor to be described below. The processing circuit 130 includes a memory (not shown in FIG. 1) that stores information, and a processor that operates based on the information stored in the memory. The information is, for example, a program and various types of data. The processor includes hardware. As the processor, various processors such as a central processing unit (CPU), a graphics processing unit (GPU), and a digital signal processor (DSP) can be used. The memory may be a semiconductor memory such as a static random access memory (SRAM) or a dynamic random access memory (DRAM), may be a register, may be a magnetic storage device such as a hard disk drive (HDD), or may be an optical storage device such as an optical disk device. For example, the memory stores an instruction readable by a computer, and when the instruction is executed by the processor, a part or all of functions of parts of the processing circuit 130 are implemented as processing. Here, the instruction may be an instruction of an instruction set constituting a program or an instruction to instruct a hardware circuit of the processor to perform an operation.

The host interface 140 is a circuit that performs interface processing related to transmission and reception of data to and from the host 200 according to a predetermined communication method. The predetermined communication method is as described above. The communication method followed by the host interface 140 may be the same as or different from the communication method followed by the first interface 110 or the second interface 120.

The host 200 is a device that is electrically coupled to the inertial sensor device 100 or the like and acquires the physical quantity output from the inertial sensor device 100. The host 200 includes a processing unit (not shown), and the processing unit can be implemented by a processor or the like similar to that of the above-described processing circuit 130. For example, the host 200 is provided in a measurement system (not shown) and controls parts of the measurement system. Based on the physical quantity acquired by the host 200, the measurement system can calculate a position and the like of a predetermined measurement object. The predetermined measurement object is, for example, a moving object such as a bicycle, a four-wheeled vehicle, a motorcycle, an electric train, an airplane, or a ship, or an electronic device such as a personal computer, a smartphone, a tablet terminal, a clock, a car navigation device, or various measurement devices, and is not particularly limited. For example, the measurement system includes the host 200, a GPS reception unit (not shown), and an antenna for GPS reception, so that the measurement system can calculate the position and the like of the predetermined measurement object. Specifically, the GPS reception unit receives a signal from a GPS satellite via the antenna, and the host 200 detects GPS positioning data representing the position, a speed, and an orientation of the predetermined measurement object based on the signal received by the GPS reception unit. The position of the predetermined measurement object is a latitude, a longitude, an altitude, or the like. In addition, the host 200 performs inertial navigation arithmetic processing on the physical quantity data acquired from the inertial sensor device 100 to obtain inertial navigation positioning data. The inertial navigation positioning data includes acceleration data and posture data of the measurement object. Further, the host 200 calculates the position and the like of the predetermined measurement object based on the obtained inertial navigation positioning data and the GPS positioning data. For example, when the predetermined measurement object is a four-wheeled vehicle, the host 200 calculates which position on the ground the four-wheeled vehicle is traveling.

In the present embodiment, as illustrated in FIG. 1, the host 200 is electrically coupled to the inertial sensor device 100, and is also electrically coupled to the first sensor 1. Specifically, for example, a package of the first sensor 1 and a package of the inertial sensor device 100 are mounted on a circuit substrate of the host 200. Accordingly, the processor constituting the processing unit of the host 200 is electrically coupled to a terminal of the package of the first sensor 1 and a terminal of the package of the inertial sensor device 100 via a predetermined signal line.

Accordingly, when the host 200 performs serial communication with the first sensor 1 and the inertial sensor device 100 according to, for example, an SPI standard, the processing unit of the host 200 can serve as a master controller for the first sensor 1 and the inertial sensor device 100.

Figure 2:
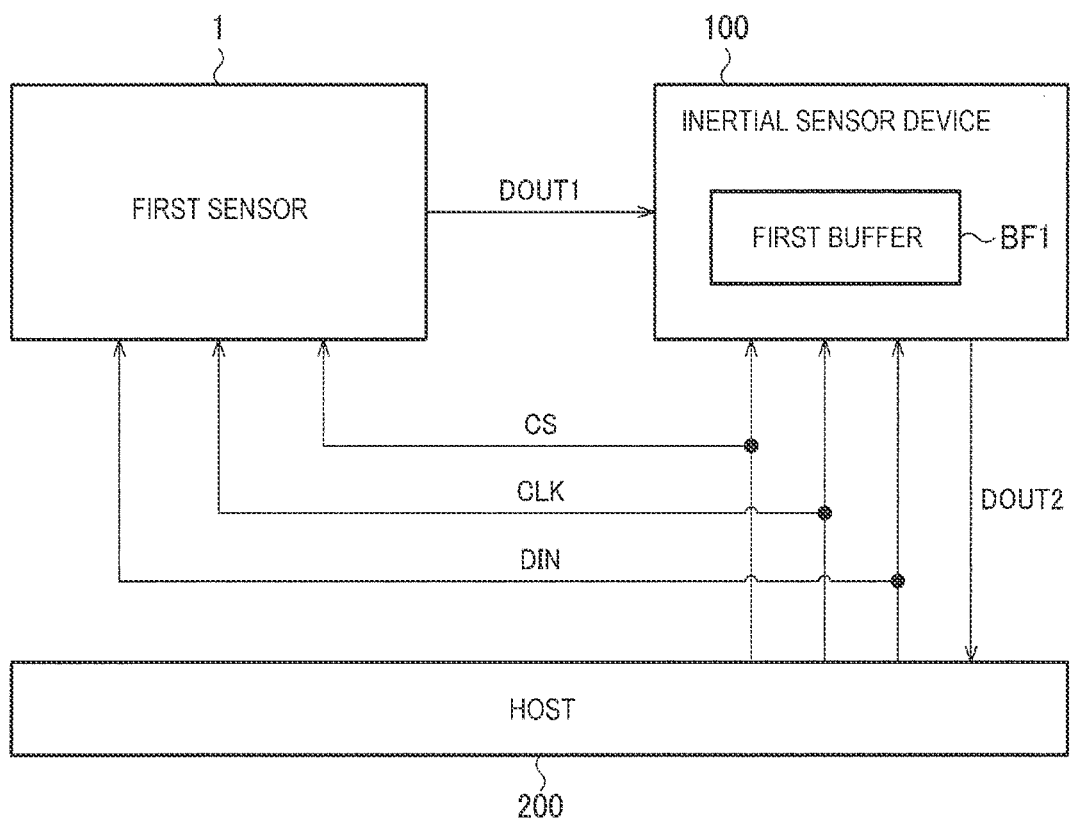
FIG. 2 is a diagram illustrating an example of a communication relationship according to the present embodiment.

Specifically, as illustrated in FIG. 2, the host 200 is coupled to the first sensor 1 and the inertial sensor device 100 by signal lines CS, CLK, and DIN. The first sensor 1 and the inertial sensor device 100 are coupled by a signal line DOUT1. Further, the inertial sensor device 100 and the host 200 are coupled by a signal line DOUT2. For example, as illustrated in FIG. 2, the host 200 can transmit and receive the digital data by coupling the signal line CS to the first sensor 1 and the inertial sensor device 100 and setting a negative logic signal passing through the signal line CS to an L level for a desired slave. At this time, the host 200 can separately acquire desired physical quantities which are the digital data from the first sensor 1 and the inertial sensor device 100, and can also couple the signal line DOUT1 of the first sensor 1 to the inertial sensor device 100 as illustrated in FIG. 2. Accordingly, the host 200 can acquire data only from the inertial sensor device 100. That is, the host 200 does not distinguish between the first sensor 1 and the inertial sensor device 100 by a logic level of a signal passing through the signal line CS, and coupling of the signal lines CS, CLK, DIN, and DOUT2 on the host 200 side is the same as that when only the inertial sensor device 100 is provided. Therefore, the host 200 can acquire the desired physical quantities from the first sensor 1 and the inertial sensor device 100 by the serial communication as if the host 200 is only in communication with the inertial sensor device 100.

In the following description, for example, a symbol CS indicates a signal line as illustrated in FIG. 2, but may be expressed or illustrated as a signal passing through the signal line. The same applies to symbols CLK, DIN, DOUT1, DOUT2, CSA, CLKA, DINA, DOUTA, CSB, CLKB, DINB, DOUTB, DRDYB, CS3, CLK3, DIN3, DOUT3, CS4, CLK4, DIN4, DOUT4, and DRDY4 to be described later. Although not illustrated in FIG. 1, the inertial sensor device 100 includes, for example, a first buffer BF1 as illustrated in FIG. 2. The first buffer BF1 can be implemented by, for example, a register in the processing circuit 130 or an output register in the host interface 140.

When the inertial sensor device 100 is coupled to the first sensor 1 by the signal line as illustrated in FIG. 2, the first interface 110 of the inertial sensor device 100 receives the first physical quantity P1, the second physical quantity P2, and the third physical quantity P3, which are sensor data, from the first sensor 1. The second interface 120 of the inertial sensor device 100 receives the high-accuracy third physical quantity HP3, which is sensor data, from the second sensor 102 at the same timing. The same timing includes substantially the same timing. Further, the processing circuit 130 outputs the first physical quantity P1 and the second physical quantity P2 received by the first interface 110 to the host 200 as they are via the host interface 140. On the other hand, the processing circuit 130 does not transmit the third physical quantity P3 received by the first interface 110 to the host 200, and outputs the high-accuracy third physical quantity HP3 received by the second interface 120 to the host 200 via the host interface 140.

Such communication can be implemented by, for example, the following method. For example, the first sensor 1 transmits the first physical quantity P1, the second physical quantity P2, and the third physical quantity P3 to the first interface 110 via the signal line DOUT1 as serial data of the SPI standard. The processing circuit 130 transmits the serial data from the first sensor 1 to the signal line DOUT2 as they are via the host interface 140 without performing serial-parallel conversion or the like. However, the processing circuit 130 replaces the third physical quantity P3 in the serial data from the first sensor 1 with data of the high-accuracy third physical quantity HP3, and transmits the data to the signal line DOUT2. At this time, the processing circuit 130 or the host interface 140 converts the high-accuracy third physical quantity HP3 into serial data of the SPI standard by parallel-serial conversion or the like, and transmits the serial data to the signal line DOUT2.

As described above, the inertial sensor device 100 according to the present embodiment includes the first interface 110, the second sensor 102, the second interface 120 that is an interface for the second sensor 102, the host interface 140 that is an interface for the host 200, and the processing circuit 130. The first interface 110 is an interface for the first sensor 1 that detects the first physical quantity P1 in the first detection axis, the second physical quantity P2 in the second detection axis, and the third physical quantity P3 in the third detection axis. The second sensor 102 detects the physical quantity in the third detection axis as the high-accuracy third physical quantity HP3 with a higher accuracy than the first sensor. The processing circuit 130 outputs the first physical quantity P1 and the second physical quantity P2 to the host 200 via the host interface 140, and outputs the high-accuracy third physical quantity HP3 instead of the third physical quantity P3 to the host 200 via the host interface 140.

As described above, since the inertial sensor device 100 according to the present embodiment includes the first interface 110 and the second interface 120, the inertial sensor device 100 can acquire the first physical quantity P1, the second physical quantity P2, and the third physical quantity P3 from the first sensor 1 and acquire the high-accuracy third physical quantity HP3 from the second sensor 102. Since the inertial sensor device 100 according to the present embodiment includes the processing circuit 130, the inertial sensor device 100 can output the first physical quantity P1 and the second physical quantity P2 acquired from the first sensor 1 and the high-accuracy third physical quantity HP3 acquired from the second sensor 102 to the host 200 via the host interface 140. When an accuracy of the physical quantity in the third detection axis is required to be higher than an accuracy of the physical quantities in the first detection axis and the second detection axis, in the related art, in order for the host 200 to acquire the high-accuracy third physical quantity HP3, an interface coupled to the second sensor 102 is required to be provided at a host 200 side to perform adjustment such as replacement of the sensor data. In this regard, by applying the method according to the present embodiment, the host 200 can acquire the high-accuracy third physical quantity HP3 instead of the third physical quantity P3 without changing a specification of the host 200 side. Although the example in which the high-accuracy third physical quantity HP3 is acquired in the third detection axis that is the Z axis is described above, the same can be applied to the first physical quantity P1 in the first detection axis that is the X axis or the second physical quantity P2 in the second detection axis that is the Y axis. In other words, by applying the method according to the present embodiment, the host 200 can acquire a physical quantity in any axis as a high-accuracy physical quantity without changing a specification on the host 200 side.

The method according to the present embodiment may be implemented as a sensor module. That is, the sensor module according to the present embodiment includes the inertial sensor device 100 and the first sensor 1. In this way, the same effect as described above can be obtained.

Specifically, for example, the sensor module according to the present embodiment can be implemented by mounting the inertial sensor device 100 and the first sensor 1 on one substrate and packaging the inertial sensor device 100 and the first sensor 1 as one semiconductor package. Accordingly, the number of components mounted on the host 200 can be reduced.

The method according to the present embodiment is not limited to the above, and various modifications can be made. For example, although the host 200 is electrically coupled to the first sensor 1 in the example of FIGS. 1 and 2, the host 200 may not be electrically coupled to the first sensor 1 as shown in a block diagram of FIG. 3. In this case, as illustrated in FIG. 4, the first sensor 1 and the inertial sensor device 100 are coupled by the signal lines CSA, CLKA, DINA, and DOUTA, and the processing circuit 130 of the inertial sensor device 100 serves as a master for the first sensor 1. The host 200 and the inertial sensor device 100 are coupled by the signal lines CSB, CLKB, DINB, and DOUTB, and the host 200 serves as a master for the processing circuit 130 of the inertial sensor device 100. Although not illustrated in FIG. 4, the inertial sensor device 100 includes a second buffer BF2 in addition to the first buffer BF1 described above with reference to FIG. 2. The second buffer BF2 can be implemented by the register of the processing circuit 130 or the host interface 140 or the like, similarly to the first buffer BF1. As illustrated in FIG. 4, the host 200 may be further coupled to the inertial sensor device 100 and the signal line DRDYB. In this way, the same effect as described above can also be obtained. The number of terminals necessary for the package of the inertial sensor device 100 is different between the example in FIG. 1 and the example in FIG. 3. As described above, since the method according to the present embodiment can be implemented by a plurality of configuration examples having different specifications, a degree of freedom in designing the package mounted on the substrate of the host 200 is improved. For example, when a package size of the inertial sensor device 100 is desired to be reduced as much as possible, adoption of the configuration example in FIG. 1 is advantageous in terms of design.

Figure 5:
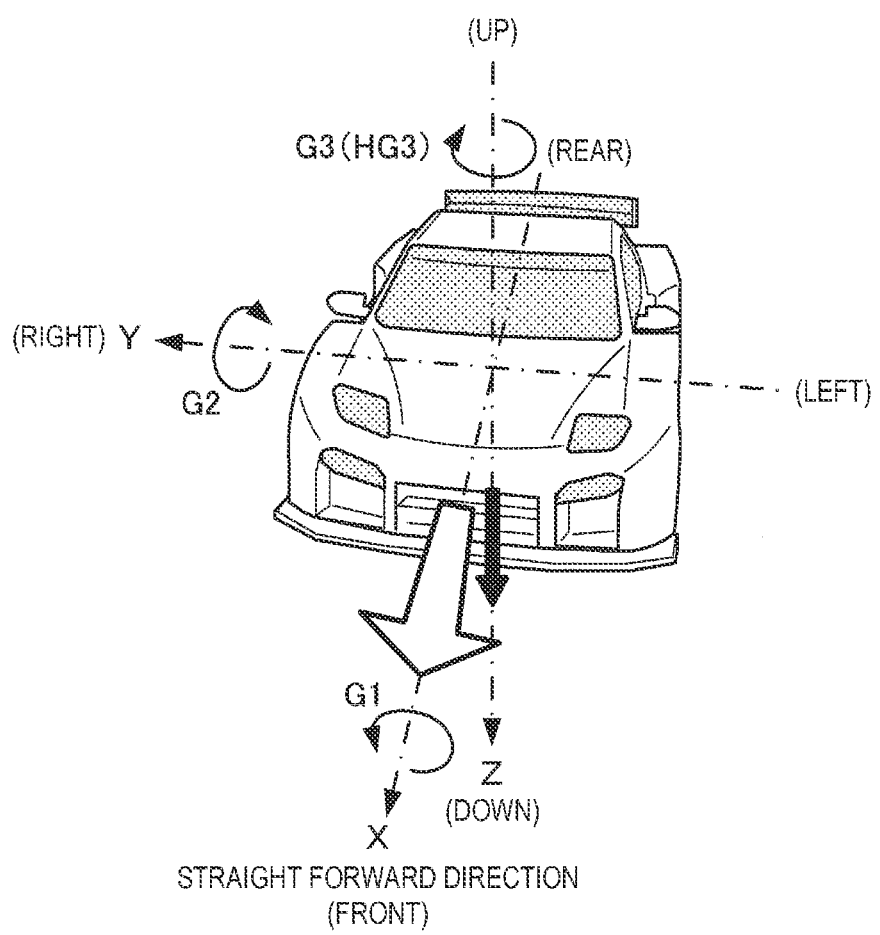
FIG. 5 is a diagram illustrating a first detection axis, a second detection axis, and a third detection axis.

Here, an example in which the accuracy of the physical quantity in the third detection axis is required to be higher than the accuracy of the physical quantity in the first detection axis and the second detection axis will be described with reference to FIGS. 5 and 6. As described above, the host 200 including the first sensor 1 and the inertial sensor device 100 is provided in the measurement system. The measurement system is fixedly mounted on the above-described moving object. FIG. 5 is a diagram illustrating a relationship between a moving direction of a four-wheeled vehicle, which is an example of the above-described moving object, and coordinate systems of the first sensor 1 and the second sensor 102 provided in the measurement system. Hereinafter, the coordinate systems of the first sensor 1 and the second sensor 102 are simply referred to as sensor coordinate systems. Directions of X axes, Y axes, and Z axes in the coordinate system of the first sensor 1 and the coordinate system of the second sensor 102 are assumed to coincide with each other. An X axis of the sensor coordinate system is a front-rear direction of the moving object, and a front direction is an X-axis positive direction. A Y axis of the sensor coordinate system is a left-right direction of the moving object, and a right direction is a Y-axis positive direction. Further, a Z axis of the sensor coordinate system is a direction orthogonal to the X axis and the Y axis, and a down direction of the moving object is a Z-axis positive direction. Since the moving object moves on a substantially horizontal plane, an XY plane is a moving plane of the moving object, and the Z-axis positive direction can be considered to coincide with a gravity direction. Further, a posture of the moving object is expressed by a roll angle around the X axis, a pitch angle around the Y axis, and a yaw angle around the Z axis. Since the moving object moves on the substantially horizontal plane as described above, the roll angle, which is the posture, corresponds to a tilt of the moving object in the left-right direction, the pitch angle, which is the posture, corresponds to a tilt of the moving object in the front-rear direction, and the yaw angle, which is the posture, corresponds to a change in the moving direction or an orientation of the moving body. In inertial navigation arithmetic processing, the posture is calculated by time-integrating an angular velocity which is an output signal of the first sensor 1 or the like. That is, in FIG. 5, when the first sensor 1 and the second sensor 102 are angular velocity sensors, the roll angle is obtained by time-integrating the first angular velocity G1 acquired by the measurement system, the pitch angle is obtained by time-integrating the second angular velocity G2, and the yaw angle is obtained by time-integrating the third angular velocity G3 or a high-accuracy third angular velocity HG3.

Figure 6:
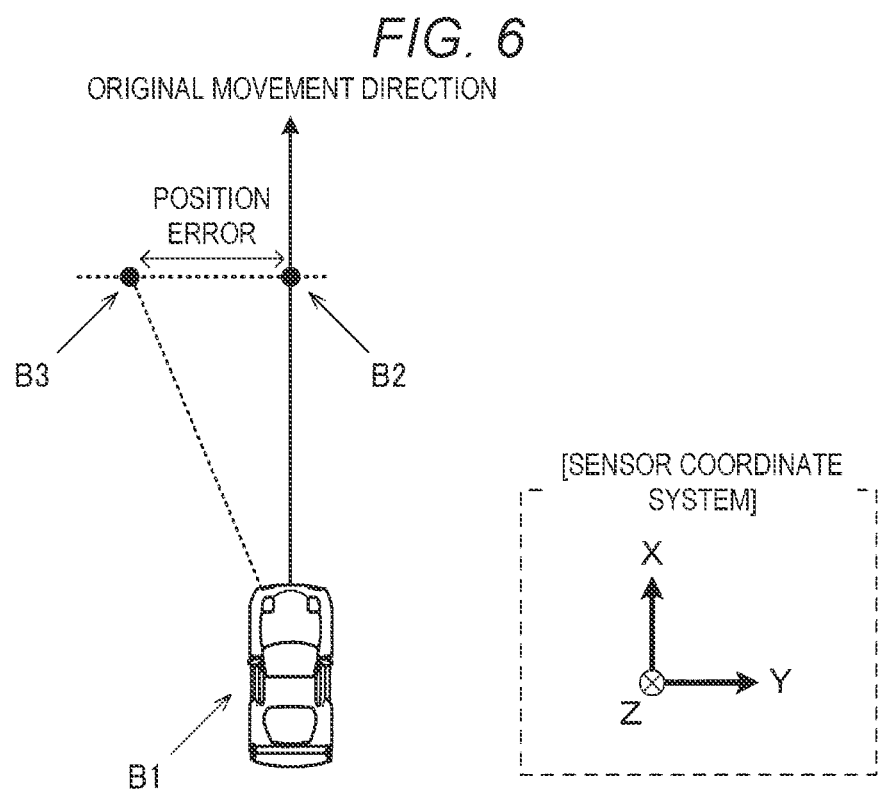
FIG. 6 is a diagram illustrating an influence of a measurement error of a third physical quantity.

FIG. 6 is a diagram illustrating a position error. FIG. 6 is diagram of the moving object as viewed from above, and illustrates an XY plane diagram in the sensor coordinate system. An actual moving direction is indicated by a solid line as an original moving direction. Since the front direction of the moving object is the X-axis positive direction, the actual moving direction is also the X-axis positive direction. A position indicated by B1 is a position of the moving object at a first time t1 and is a known position. A position indicated by B2 is an actual position of the moving object at a second time t2, and a position indicated by B3 is a position of the moving object at the second time t2, which is calculated by the inertial navigation arithmetic processing using the measurement system. A distance between the position indicated by B2 and the position indicated by B3 is a position error caused by a bias error of the output signal of the first sensor 1 while the moving object moves from the first time t1 to the second time t2. As described above, since the moving object moves on the substantially horizontal plane, positional displacement is caused by an error of the yaw angle which is the posture. Further, the error of the yaw angle increases as time passes. Thus, it is desirable that the error of the yaw angle is smaller than an error of the roll angle and an error of the pitch angle, in other words, it is desirable that a measurement accuracy of an angular velocity around the Z axis is higher than a measurement accuracy of an angular velocity around the X axis and a measurement accuracy of an angular velocity around the Y axis. In this regard, by applying the method according to the present embodiment, the measurement system can acquire the yaw angle based on the high-accuracy third physical quantity HP3 having a higher accuracy than the third physical quantity P3, instead of the third physical quantity P3. Accordingly, the position of the moving object or the like can be more appropriately predicted.

As described above, in the inertial sensor device 100 according to the present embodiment, the third physical quantity P3 and the high-accuracy third physical quantity HP3 are angular velocities around the third detection axis which is the Z axis. In this way, the host 200 can acquire the high-accuracy third angular velocity HG3 without changing the specification of the host 200 side.

Figure 7:
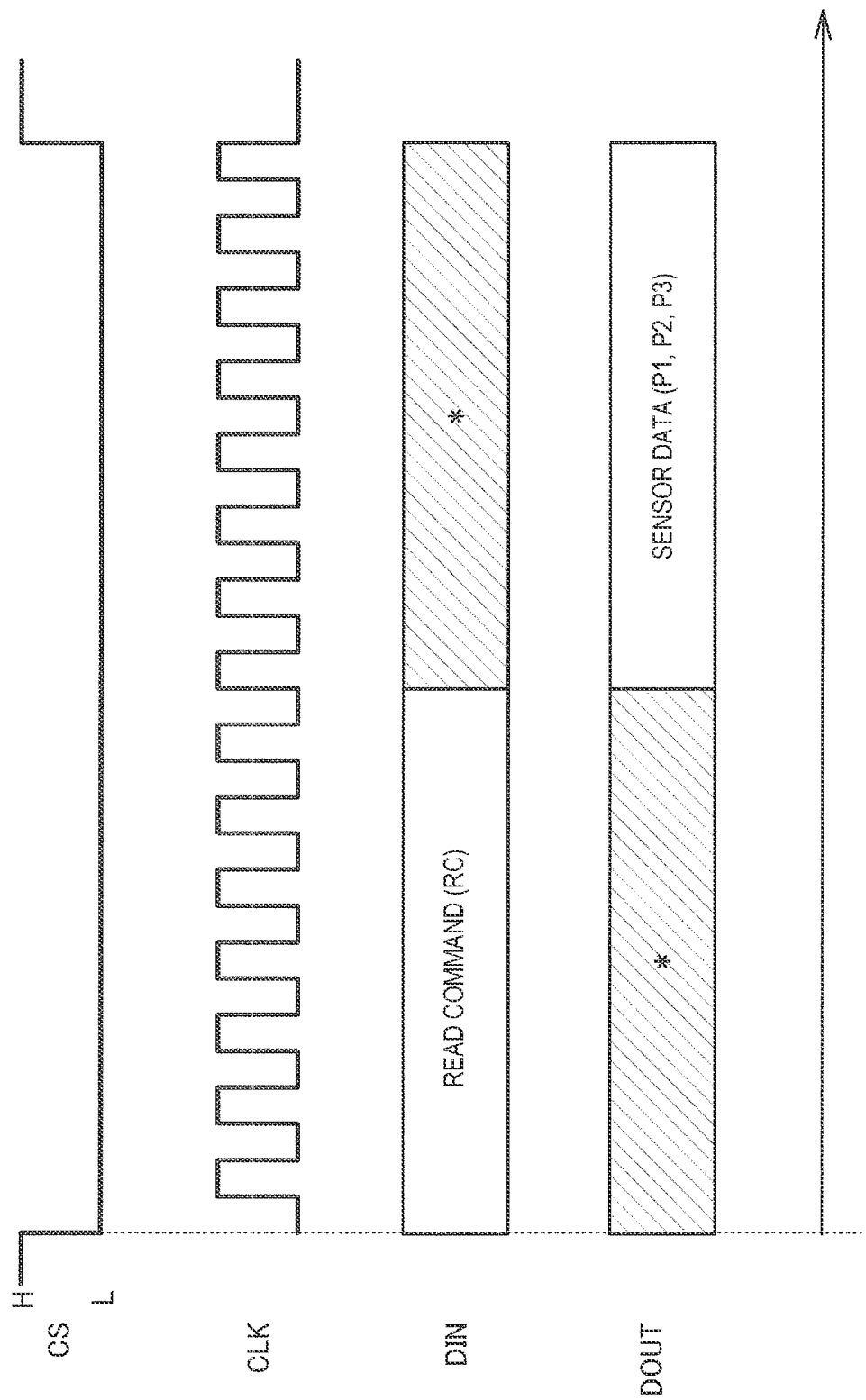
FIG. 7 is a diagram illustrating an example of data communication according to the present embodiment.
Figure 8:
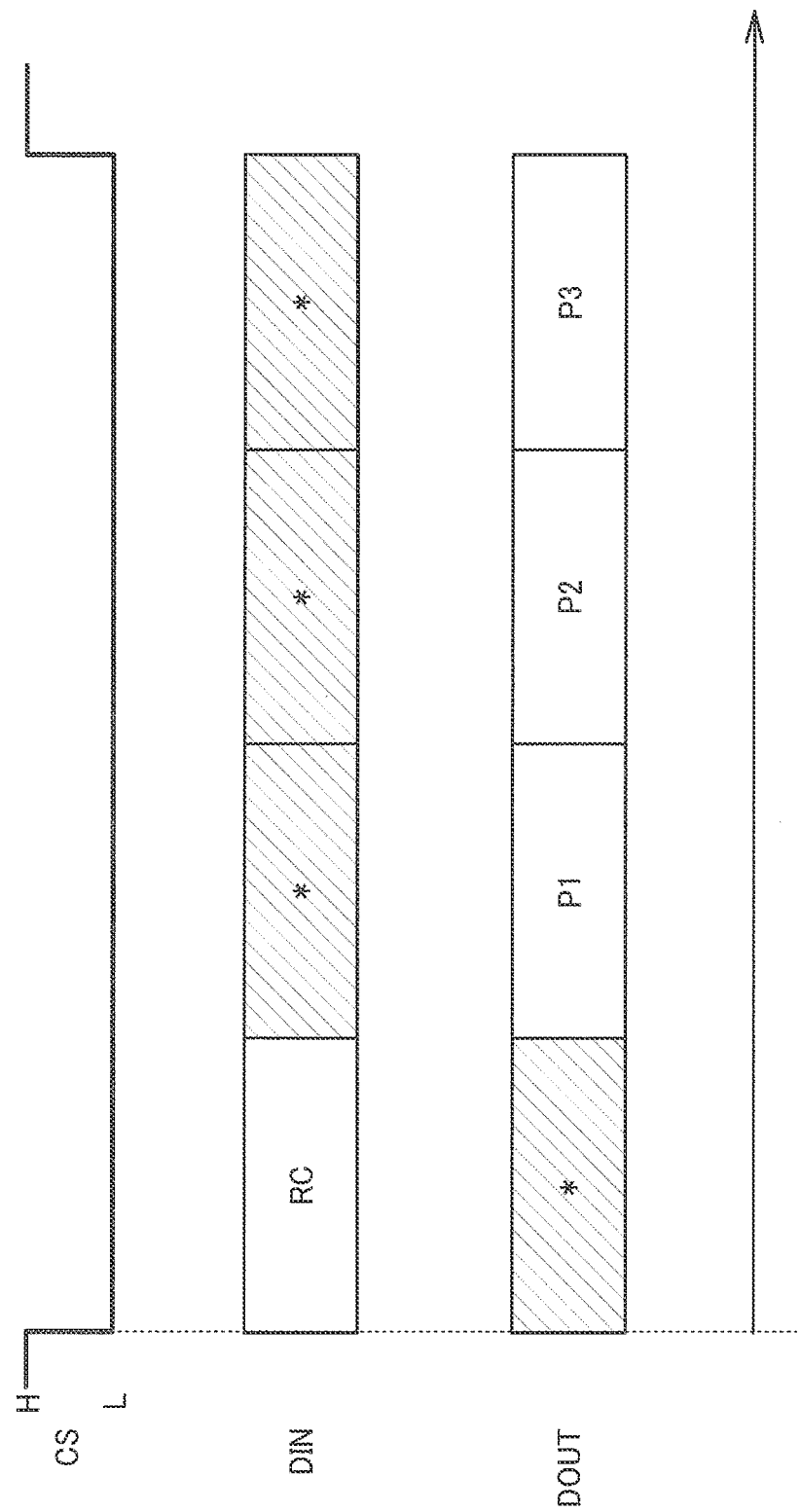
FIG. 8 is a diagram illustrating another example of the data communication according to the present embodiment.

Next, a specific method in which the inertial sensor device 100 outputs the first physical quantity P1 and the second physical quantity P2 to the host 200 and outputs the high-accuracy third physical quantity HP3 instead of the third physical quantity P3 to the host 200 will be described with reference to FIGS. 7, 8, 9, and 10. FIG. 7 is a diagram illustrating a basic example of a communication method used in the present embodiment, and illustrates an example in which, for example, the host 200 that is a master communicates with a predetermined physical quantity sensor serving as a slave. In the following description, for example, transmission and reception of data by a communication interface (not shown) of the host 200 is simply referred to as transmission and reception of data by the host 200. First, the host 200, which is the master, sets the negative logic signal CS to the L level. Accordingly, the predetermined physical quantity sensor is chip-selected. The chip-select is also referred to as slave-select. Further, the host 200, which is the master, transmits an 8-bit read command RC to the predetermined physical quantity sensor via the signal line DIN in synchronization with a clock of the signal CLK. That is, the clock of the signal CLK here is based on an oscillation circuit (not shown) of the host 200. Here, the read command RC includes, for example, a bit instructing read/write in the first one bit, and the host 200 sets a value instructing read for the bit. Thereafter, the predetermined physical quantity sensor transmits 8-bit sensor data to the host using the signal line DOUT2 in synchronization with a clock signal of the signal line CLK. "*" in FIG. 7 means don't-care, and the same applies to FIG. 8 and subsequent figures. Hereinafter, description of synchronization with the clock from the signal CLK may be omitted. In FIG. 8 and the subsequent figures, the clock of the signal CLK is not illustrated. The same applies to the signals CLKA, CLKB, CLK3, and CLK4 to be described later.

In this way, for example, when the predetermined physical quantity sensor detects only a physical quantity in one axial direction, the host 200 can acquire the first physical quantity P1, the second physical quantity P2, and the third physical quantity P3 by preparing three predetermined physical quantity sensors and setting respective detection axes to the first detection axis, the second detection axis, and the third detection axis described above. However, the method according to the present embodiment is not limited thereto, and for example, when one master sends one read command RC to the slave, the master may read a plurality of pieces of data from the slave. This function is called a burst read function. FIG. 8 shows an example in which the host 200, which is a master, communicates with a predetermined three-axis physical quantity sensor as a slave. As illustrated in FIG. 8, when one read command RC is transmitted to the predetermined three-axis physical quantity sensor, the host 200, which is a master, can read physical quantities corresponding to the first physical quantity P1, the second physical quantity P2, and the third physical quantity P3 from the predetermined three-axis physical quantity sensor by applying the above-described burst read function.

Figure 9:
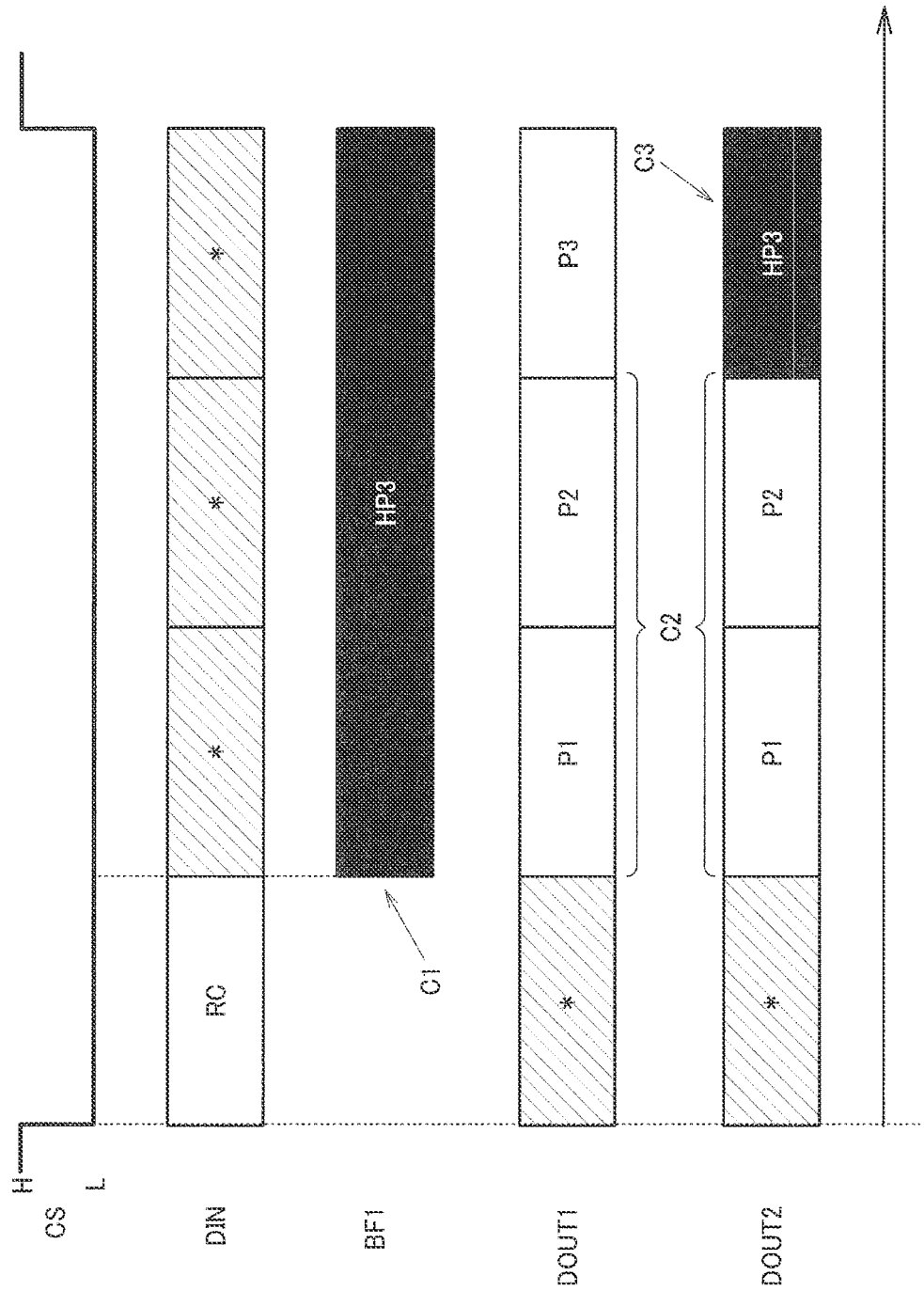
FIG. 9 is a time chart illustrating a method according to the present embodiment.

FIG. 9 is a diagram illustrating an example of a timing chart in which the host 200 acquires the high-accuracy third physical quantity HP3 and the like by applying the method according to the present embodiment. The first sensor 1, the inertial sensor device 100, and the host 200 are coupled by the signal lines illustrated in FIG. 2. The second interface 120 of the inertial sensor device 100 periodically samples the high-accuracy third physical quantity HP3 from the second sensor 102. In the present embodiment, it is assumed that no problem regarding timings of data transmission and reception in the first sensor 1, the inertial sensor device 100, the host 200, and the like occurs.

The host 200 sets the signal CS to the L level to chip-select both the first sensor 1 and the inertial sensor device 100, and transmits the read command RC to a communication interface for the first sensor 1 and the host interface 140 of the inertial sensor device 100 via the signal line DIN. As indicated by C1, the processing circuit 130 of the inertial sensor device 100 stores the digital data of the high-accuracy third physical quantity HP3 in the first buffer BF1. When receiving the read command RC from the host 200, the first sensor 1 transmits the first physical quantity P1, the second physical quantity P2, and the third physical quantity P3 to the first interface 110 of the inertial sensor device 100 via the signal line DOUT1. In other words, by setting a predetermined address to a second bit and a subsequent bit of the read command RC transmitted by the host 200, the first sensor 1 can transmit the first physical quantity P1, the second physical quantity P2, and the third physical quantity P3, and the processing circuit 130 can store the high-accuracy third physical quantity HP3 in the first buffer BF1.

Further, as indicated by C2, the processing circuit 130 transmits the first physical quantity P1 and the second physical quantity P2 received via the first interface 110 to the host 200 as they are via the host interface 140 and the signal line DOUT2. As indicated by C3, the processing circuit 130 replaces the third physical quantity P3 with the high-accuracy third physical quantity HP3 stored in the first buffer BF1 at a timing of transmitting the third physical quantity P3, and transmits the high-accuracy third physical quantity HP3 to the host 200 via the host interface 140 and the signal line DOUT2. In this way, the host 200 can receive the high-accuracy third physical quantity HP3 instead of the third physical quantity P3.

Figure 10:
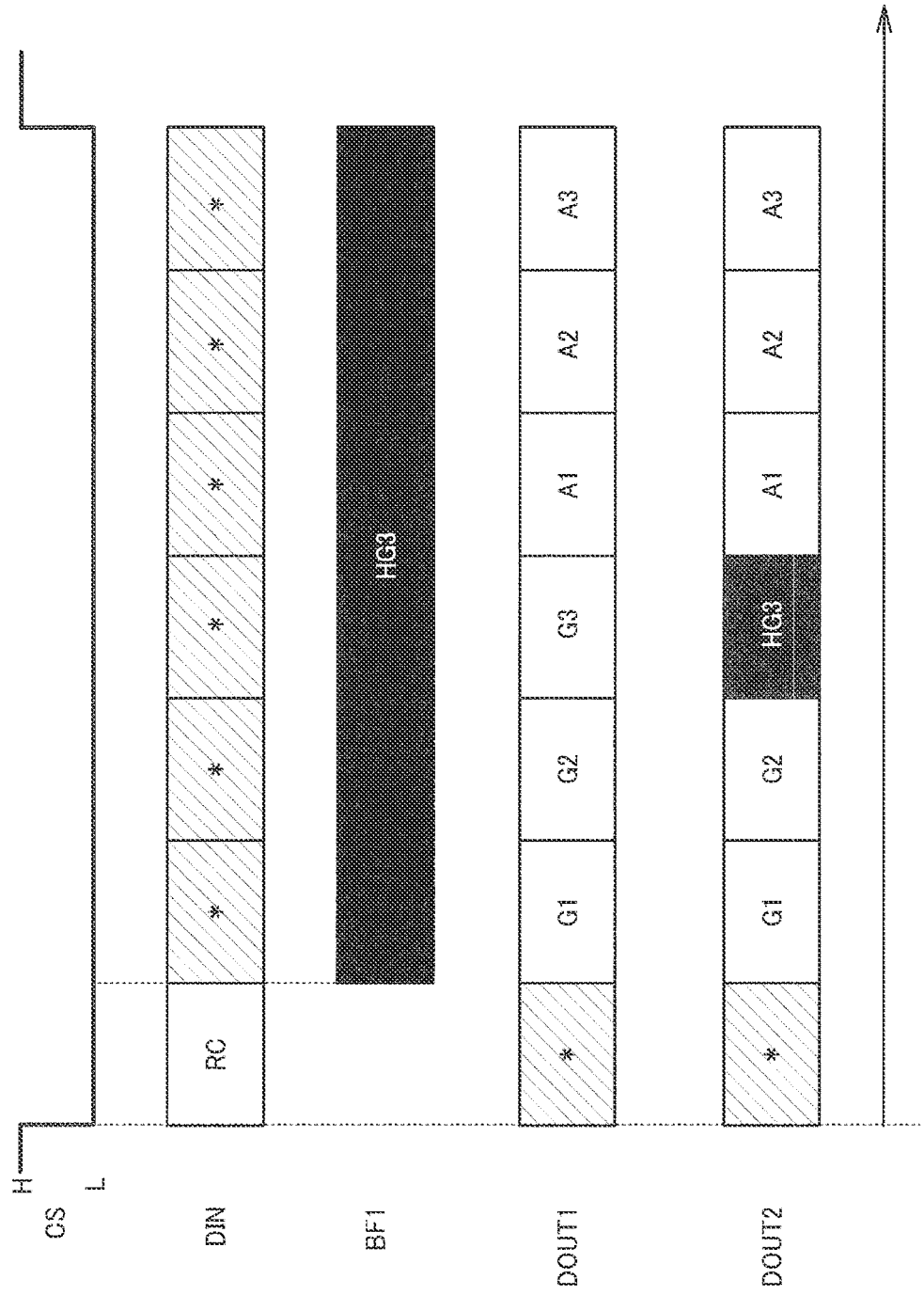
FIG. 10 is a time chart illustrating another method according to the present embodiment.

In the above description, the first sensor 1 is described as a three-axis sensor, but the method according to the present embodiment is not limited thereto, and various modifications can be made. For example, the first sensor 1 may be a six-axis sensor. The six-axis sensor includes, for example, a three-axis physical quantity sensor that can independently detect physical quantities in an X-axis direction, a Y-axis direction, and a Z-axis direction, and a three-axis physical quantity sensor that can independently detect other physical quantities in the X-axis direction, the Y-axis direction, and the Z-axis direction. For example, when the first sensor 1 includes a three-axis acceleration sensor and a three-axis angular velocity sensor, the first sensor 1 detects the first angular velocity G1, the second angular velocity G2, the third angular velocity G3, the first acceleration A1, the second acceleration A2, and the third acceleration A3. Further, as described above with reference to FIGS. 5 and 6, when it is desired to obtain a more accurate angular velocity in the Z direction than the third angular velocity G3, the inertial sensor device 100 acquires the high-accuracy third angular velocity HG3 by using the second sensor 102 as a Z-axis angular velocity sensor. Further, as illustrated in FIG. 10, the host interface 140 can transmit the first angular velocity G1, the second angular velocity G2, the high-accuracy third angular velocity HG3, the first acceleration A1, the second acceleration A2, and the third acceleration A3 to the host 200 by applying the above-described method. A sensor unit including an acceleration sensor and an angular velocity sensor may be referred to as an inertial measurement unit (IMU).

Figure 3:
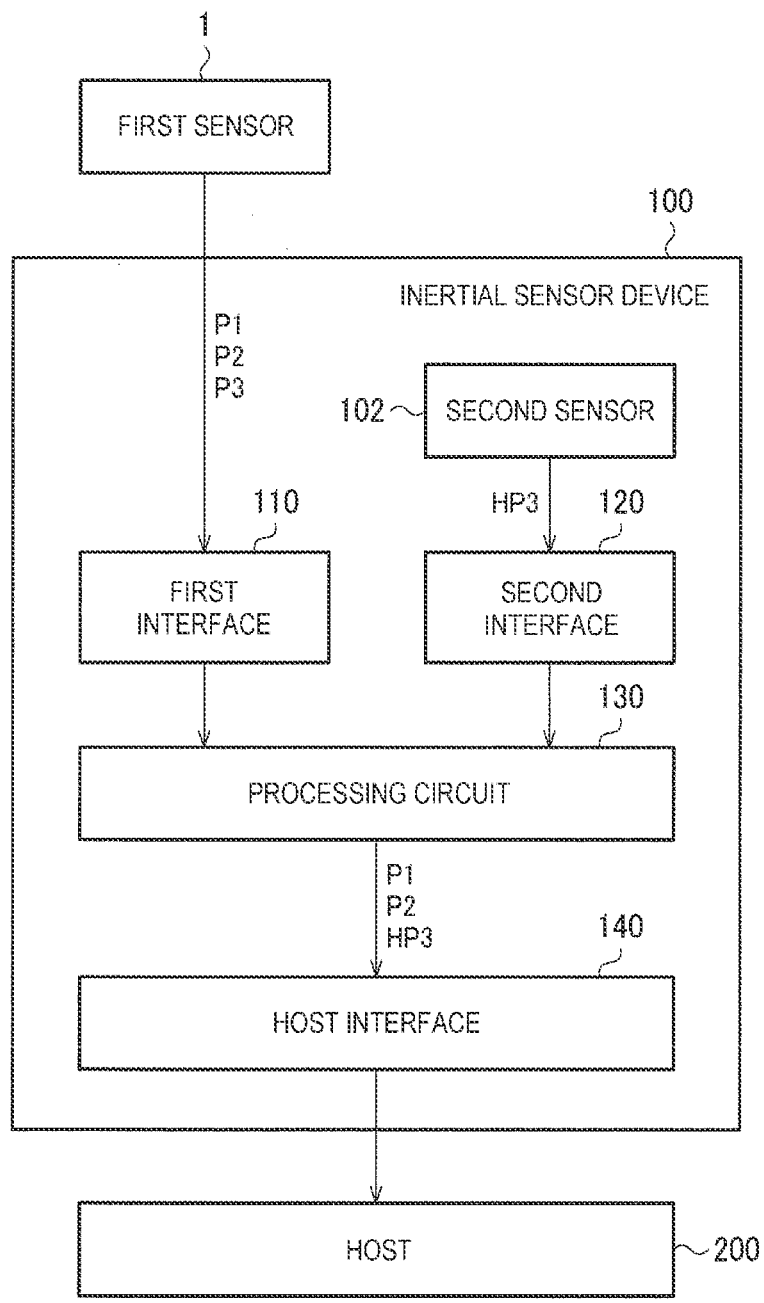
FIG. 3 is a diagram illustrating another configuration example according to the present embodiment.
Figure 4:
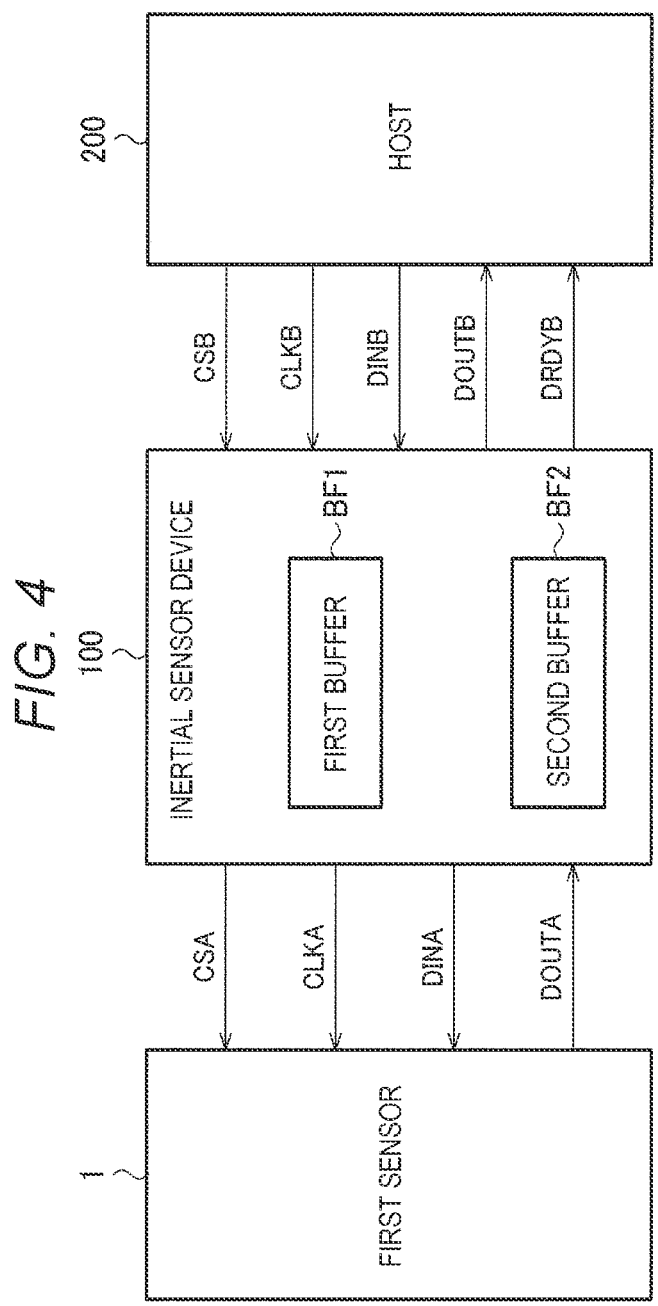
FIG. 4 is a diagram illustrating another example of the communication relationship according to the present embodiment.
Figure 11:
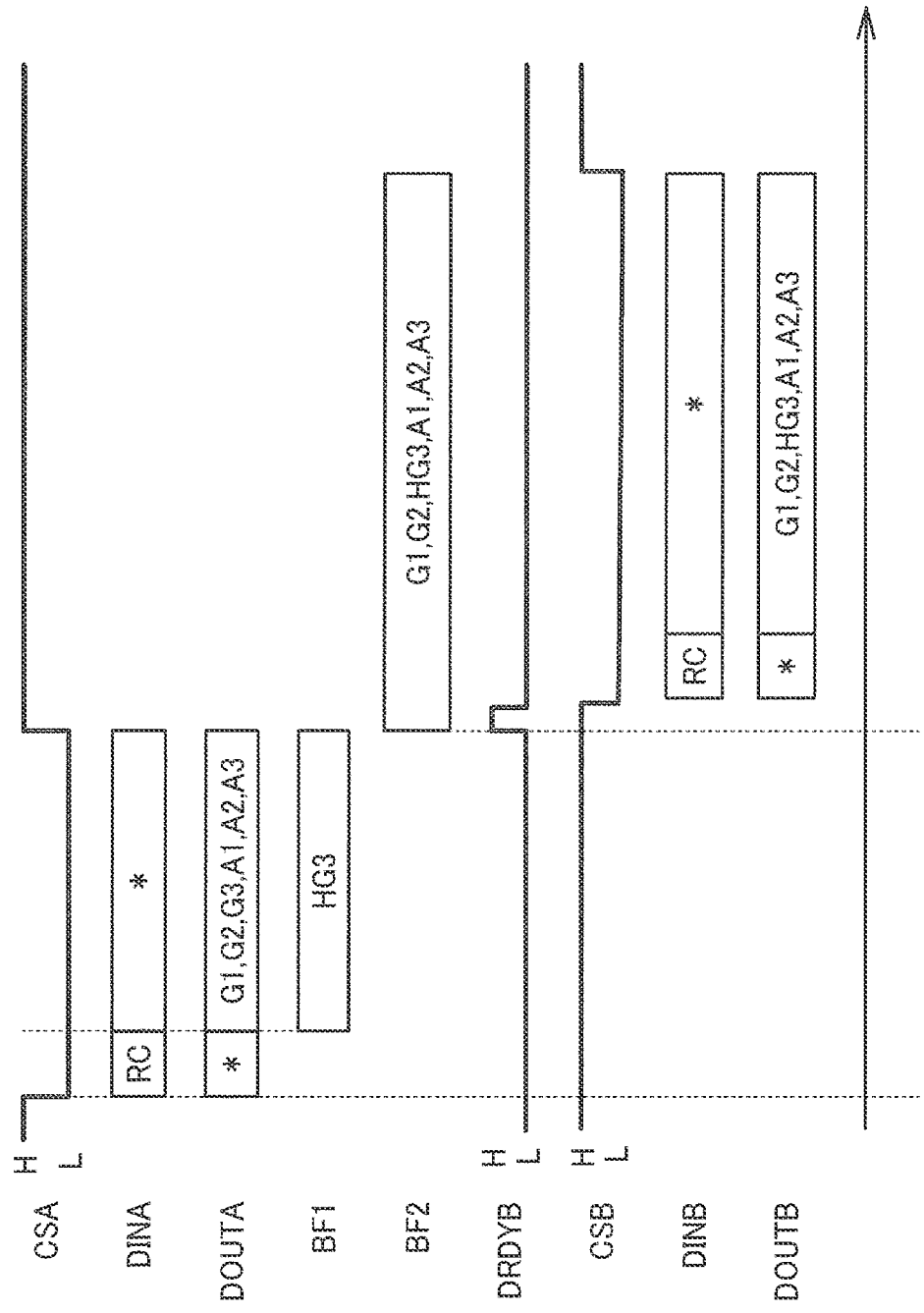
FIG. 11 is a time chart illustrating another method according to the present embodiment.

In the case of the examples illustrated in FIGS. 3 and 4, the host 200 can acquire the high-accuracy third physical quantity HP3 or the like according to the timing chart illustrated in FIG. 11, for example. The processing circuit 130 of the inertial sensor device 100 serves as a master for the first sensor 1, and sets the signal CSA to an L level. Further, the processing circuit 130 stores the high-accuracy third angular velocity HG3 acquired from the second sensor 102 in the first buffer BF1. The inertial sensor device 100 transmits the read command RC to the first sensor 1 via the signal line DINA in synchronization with the signal CLKA, and reads the first angular velocity G1, the second angular velocity G2, the third angular velocity G3, the first acceleration A1, the second acceleration A2, and the third acceleration A3 from the first sensor 1 via the signal line DOUTA. Further, the processing circuit 130 stores, in the second buffer BF2, the read first angular velocity G1, second angular velocity G2, first acceleration A1, second acceleration A2, and third acceleration A3 and the high-accuracy third angular velocity HG3 stored in the first buffer BF1. At this timing, the processing circuit 130 sets the signal DRDYB to an H level to notify the host 200 that data can be transmitted. Thereafter, the host 200 serves as a master for the inertial sensor device 100, sets the signal CSB to an L level, and transmits the read command RC to the host interface 140 via the signal line DINB in synchronization with the signal CLKB. Then, the host 200 reads the first angular velocity G1, the second angular velocity G2, the high-accuracy third angular velocity HG3, the first acceleration A1, the second acceleration A2, and the third acceleration A3 via the signal line DOUTB.

Although the example in which the inertial sensor device 100 according to the present embodiment outputs the high-accuracy third angular velocity HG3 instead of the third angular velocity G3 to the host 200 has been described above, the method according to the present embodiment is not limited thereto, and for example, the inertial sensor device 100 may output high-accuracy third acceleration HA3 to the host 200 instead of the third acceleration A3. That is, in the inertial sensor device 100 according to the present embodiment, the third physical quantity P3 and the high-accuracy third physical quantity HP3 are accelerations around the third detection axis which is the Z axis. In this way, when an acceleration in a predetermined axis is required to be more accurate than accelerations in other axes, the host 200 can acquire the high-accuracy third acceleration HA3 without changing the specification on the host 200 side. The case where the acceleration in the predetermined axis is required to be more accurate than the accelerations in other axes is, for example, a case where accurate measurement or control of a position of an object including a linear motion mechanism is required, and specifically, a case of a maglev car or the like.

When the above-described six-axis sensor is implemented by the Si-MEMS inertial sensor described above, size reduction can be achieved, but sensor data with an accuracy enough to satisfy requirements described above with reference to FIG. 5 and the like cannot be obtained. On the other hand, when the first sensor 1 is configured such that the above-described six physical quantities can be acquired only by the above-described crystal inertial sensor, sensor data with high an accuracy can be obtained, but the size reduction cannot be achieved. Therefore, in the present embodiment, the first sensor 1 which is the small-sized six-axis sensor may be implemented by the Si-MEMS inertial sensor, and the second sensor 102 may be implemented by a crystal inertia sensor to acquire a physical quantity only in a direction in which a high accuracy is required. As described above, in the inertial sensor device 100 according to the present embodiment, the first sensor 1 is the MEMS inertial sensor, and the second sensor 102 is the crystal inertial sensor. In this way, a physical quantity sensor that achieves both size reduction and high accuracy can be provided.

Figure 12:
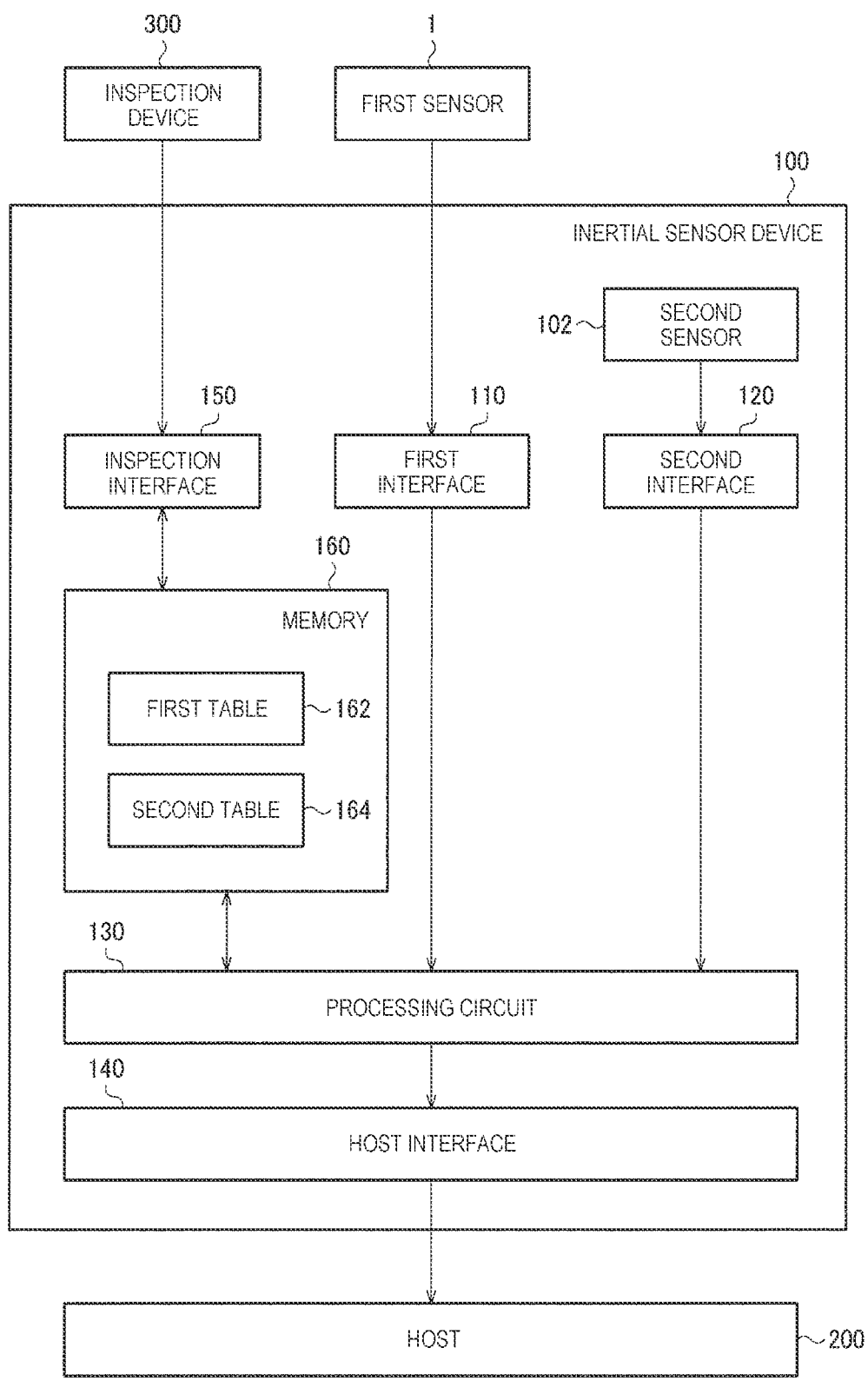
FIG. 12 is a block diagram illustrating a modification of the present embodiment.

The method according to the present embodiment is not limited to the above, and various modifications can be made. For example, the inertial sensor device 100 according to the present embodiment may have a configuration as illustrated in a block diagram in FIG. 12 as a modification. An example illustrated in FIG. 12 is different from the examples illustrated in FIGS. 1 and 3 in that the inertial sensor device 100 further includes an inspection interface 150 that can be coupled to an inspection device 300 and a memory 160. Since symbols are the same as those in FIGS. 1 and 3, detailed description thereof will be omitted.

Figure 13:
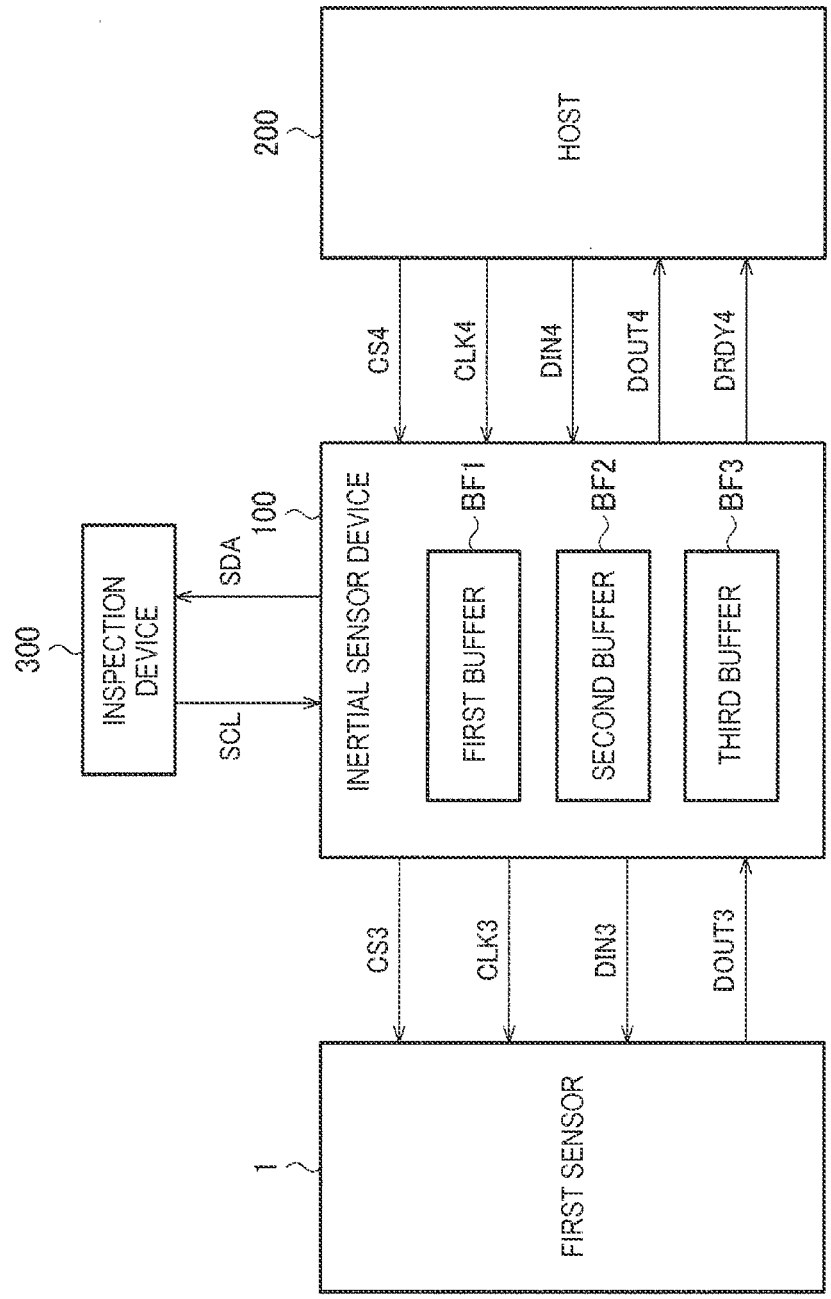
FIG. 13 is a diagram illustrating an example of a communication relationship according to the modification of the present embodiment.

In the case of the modification in FIG. 12, a relationship between signal lines to be coupled may be as illustrated in FIG. 13. Specifically, the inertial sensor device 100 is coupled to the first sensor by the signal line CS3, the signal line CLK3, the signal line DIN3, and the signal line DOUT3. The inertial sensor device 100 is coupled to the host 200 by the signal line CS4, the signal line CLK4, the signal line DIN4, the signal line DOUT4, and the signal line DRDY4. The inertial sensor device 100 is coupled to the inspection device 300 by a signal line SCL and a signal line SDA. Although not illustrated in FIG. 12, the inertial sensor device 100 includes a third buffer BF3 in addition to the first buffer BF1 described above with reference to FIGS. 2 and 4 and the second buffer BF2 described above with reference to FIG. 4. The third buffer BF3 can be implemented by a register of the processing circuit 130 or the host interface 140 or the like, similarly to the first buffer BF1 and the second buffer BF2.

As illustrated in FIG. 12, the memory 160 further includes a first table 162 and a second table 164. The first table 162 is, for example, a table in which zero point correction coefficients are stored. Specifically, for example, by obtaining zero point data for every predetermined temperature in a predetermined temperature range and plotting the obtained data group, a function approximated to an n-th order polynomial related to a temperature can be obtained as a correction function. In the n-th order polynomial, n+1 coefficients of n-th to 0-th order are the zero point correction coefficients. Based on these coefficients, when no physical action acts on the first sensor 1 and the second sensor 102, the first sensor 1 and the second sensor 102 output a signal indicating that a physical quantity is zero in the above-described predetermined temperature range.

The second table 164 is a table in which misalignment correction coefficients related to a misalignment correction are stored. Misalignment is also referred to as an attachment error. For example, in the measurement system described above with reference to FIG. 5 and the like, due to an attachment error of the first sensor 1 and the like with respect to the substrate of the host 200, the directions of the X axis, the Y axis, and the Z axis of the moving object may not accurately coincide with the directions of the first detection axis, the second detection axis, and the third detection axis of the first sensor 1 and the like. Therefore, in consideration of the misalignment, the first physical quantity P1 and the like output by the first sensor 1 and the like are corrected using, for example, a matrix represented by the following Formula (1). That is, the misalignment correction coefficients are components M11, M12, M13, M21, M22, M23, M31, M32, and M33 of the matrix represented by Formula (1). The method for obtaining the misalignment correction coefficients is known, and detailed description thereof will be omitted.

$$\begin{pmatrix} PA1 \\ PA2 \\ PA3 \end{pmatrix} = \begin{pmatrix} M11 & M12 & M13 \\ M21 & M22 & M23 \\ M31 & M32 & M33 \end{pmatrix} \begin{pmatrix} PB1 \\ PB2 \\ PB3 \end{pmatrix} \quad (1)$$

PA1: first physical quantity after misalignment correction
PA2: second physical quantity after misalignment correction
PA3: third physical quantity after misalignment correction
PB1: first physical quantity before misalignment correction
PB2: second physical quantity before misalignment correction
PB3: third physical quantity before misalignment correction The memory 160 is, for example, a nonvolatile memory, and can be implemented by, for example, an electrically erasable programmable read only memory (EEPROM), or a flash memory. The EEPROM can be implemented by, for example, a floating gate type memory cell. The flash memory can be implemented by, for example, a metal oxide nitride oxide silicon (MONOS) memory cell.

The inspection interface 150 is a circuit that performs interface processing related to transmission and reception of digital data to and from the inspection device 300 according to a specific communication method. The specific communication method is, for example, I2C, and may be another communication standard or a communication standard in which a part of these standards is improved or modified. The inspection device 300 is a device that writes the zero point correction coefficients, the misalignment correction coefficients, or the like into the memory 160. In order to enable the inertial sensor device 100 to independently communicate with the inspection device 300 after the inertial sensor device 100 is mounted on the substrate of the host 200, it is desirable to assign, to the terminal of the package of the inertial sensor device 100, a dedicated terminal to be coupled to the inspection device 300. As illustrated in FIG. 13, the inspection interface 150 can communicate with the inspection device 300 through the two signal lines including the signal line SCL and the signal line SDA by setting the specific communication method to I2C, and thus the number of the dedicated terminals can be minimized. Accordingly, the number of terminals of the package of the inertial sensor device 100 can be reduced. Accordingly, an unnecessary increase in size of the package can be avoided.

When the inertial sensor device 100 is, for example, the above-described surface-mounting type package, the inertial sensor device 100 is positioned at a desired position on the substrate of the host 200, and then the inertial sensor device 100 and the host 200 are firmly bonded to each other by solder bonding using a reflow furnace, thereby achieving surface mounting. It is known as an empirical known fact that characteristics of the sensor device change after the sensor device is surface-mounted on a desired substrate in this way. For example, although illustration is omitted, it is known as an empirical known fact that a position of a zero point voltage at a predetermined temperature and a measurement result of temperature dependence of the zero point voltage are different before and after the surface mounting. It is considered that a reason why the characteristics of the sensor device change after the surface mounting is performed is that a hole or a carrier present in a piezoelectric thin film layer or an electrode layer of the sensor element is excited to generate a microcurrent, that distortion caused by a change in an in-plane stress distribution of a substrate affects the sensor element, or the like.

For the reason described above, a value of a zero point or the temperature dependence of the inertial sensor device 100 may be changed after the inertial sensor device 100 is surface-mounted on the host. Therefore, the user may obtain the above-described correction function after the surface mounting and store the coefficients of the polynomial of the correction function in the memory 160. Further, the processing circuit 130 performs an arithmetic processing based on the correction function before transmitting the first physical quantity P1, the second physical quantity P2, and the high-accuracy third physical quantity HP3 from the host interface 140 to the host. Accordingly, the host interface 140 can output a first physical quantity CP1, a second physical quantity CP2, and a high-accuracy third physical quantity CHP3, which are obtained after the correction, to the host 200. That is, the processing circuit 130 performs a zero point correction on the first physical quantity P1, the second physical quantity P2, and the high-accuracy third physical quantity HP3, and the host interface 140 outputs, to the host 200, the first physical quantity CP1, the second physical quantity CP2, and the high-accuracy third physical quantity CHP3 which are obtained after the zero point correction. In this way, the zero point changed due to thermal influence or the like can be corrected. Accordingly, even after the inertial sensor device 100 is surface-mounted on the substrate of the host 200, the host 200 can acquire the first physical quantity CP1, the second physical quantity CP2, and the high-accuracy third physical quantity CHP3, which are obtained after the correction and are appropriate data.

As described above, after the inertial sensor device 100 is surface-mounted on the host, the directions of the detection axes of the first sensor 1 or the second sensor 102 may be changed due to distortion or the like of the substrate. Therefore, a user may obtain the above-described misalignment correction coefficients and store the misalignment correction coefficients in the memory 160. Further, the processing circuit 130 performs an arithmetic processing based on the above-described Formula (1) before the first physical quantity P1, the second physical quantity P2, and the high-accuracy third physical quantity HP3 are transmitted from the host interface 140 to the host. Accordingly, the host interface 140 can output the first physical quantity CP1, the second physical quantity CP2, and the high-accuracy third physical quantity CHP3, which are obtained after the correction, to the host 200. That is, the processing circuit 130 performs an alignment correction between the detection axes on the first physical quantity P1, the second physical quantity P2, and the high-accuracy third physical quantity HP3, and the host interface 140 outputs, to the host 200, the first physical quantity CP1, the second physical quantity CP2, and the high-accuracy third physical quantity CHP3 which are obtained after the alignment correction. In this way, alignment between the detection axes changed due to the thermal influence or the like can be corrected. Accordingly, even after the inertial sensor device 100 is surface-mounted on the substrate of the host 200, the host 200 can acquire the first physical quantity CP1, the second physical quantity CP2, and the high-accuracy third physical quantity CHP3, which are obtained after the correction and are appropriate data. The processing circuit 130 may perform the misalignment correction and the above-described zero point correction at the same time.

Figure 14:
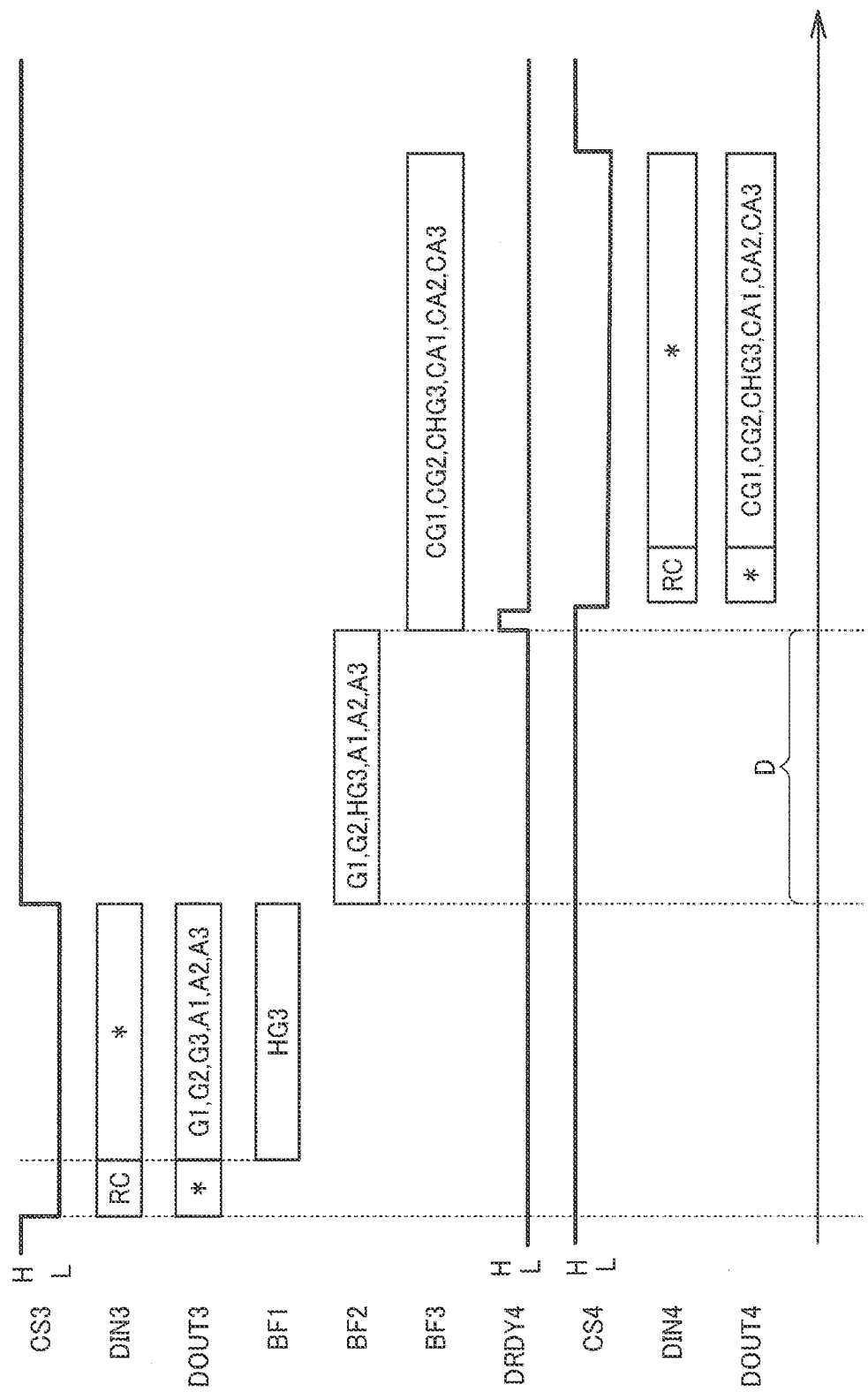
FIG. 14 is a time chart illustrating a method according to the modification of the present embodiment.

FIG. 14 is a diagram illustrating an example of a timing chart in a method according to the modification. In the illustration of FIG. 14, a part of the same contents as those described above will be omitted. The processing circuit 130 of the inertial sensor device 100 serves as a master for the first sensor 1, and sets the signal CS3 to an L level. Further, the processing circuit 130 stores the high-accuracy third angular velocity HG3 acquired from the second sensor 102 in the first buffer BF1. The inertial sensor device 100 transmits the read command RC to the first sensor 1 via the signal line DIN3, and reads the first angular velocity G1, the second angular velocity G2, the third angular velocity G3, the first acceleration A1, the second acceleration A2, and the third acceleration A3 from the first sensor 1 via the signal line DOUT3. That is, although not illustrated, a clock of the signal CLK3 is based on the oscillation circuit (not shown) of the inertial sensor device 100 which is a master.

Further, the processing circuit 130 stores, in the second buffer BF2, the read first angular velocity G1, second angular velocity G2, first acceleration A1, second acceleration A2, and third acceleration A3 and the high-accuracy third angular velocity HG3 stored in the first buffer BF1.

Thereafter, the processing circuit 130 performs correction processing such as the above-described zero point correction on the first angular velocity G1, the second angular velocity G2, the first acceleration A1, the second acceleration A2, the third acceleration A3, and the high-accuracy third angular velocity HG3 stored in the second buffer BF2. The arithmetic processing requires a period indicated by D in FIG. 14.

When the correction processing ends, the processing circuit 130 stores, in the third buffer BF3, a first angular velocity CG1, a second angular velocity CG2, a high-accuracy third angular velocity CHG3, a first acceleration CA1, a second acceleration CA2, and a third acceleration CA3 which are obtained after the correction. At this timing, the processing circuit 130 sets the signal DRDY4 to an H level to notify the host 200 that the data obtained after the correction can be transmitted.

Thereafter, the host 200 serves as a master for the inertial sensor device 100, sets the signal CS4 to an L level, and transmits the read command RC to the host interface 140 of the inertial sensor device 100 via the signal line DIN4 in synchronization with the signal CLK4. Then, the host 200 reads the first angular velocity CG1, the second angular velocity CG2, the high-accuracy third angular velocity CHG3, the first acceleration CA1, the second acceleration CA2, and the third acceleration CA3, which are obtained after the correction, via the signal line DOUT4. In this way, the host 200 can acquire the sensor data which is obtained after the correction. The reason why the example of the timing chart illustrated in FIG. 14 is different from the examples of the timing charts illustrated in FIGS. 9 and 11 is that the period indicated by D in FIG. 14 is longer than a period of a response to the read command RC transmitted from the host 200.

As described above, the inertial sensor device according to the present embodiment includes a first interface, a second sensor, a second interface that is an interface for the second sensor, a host interface that is an interface for a host, and a processing circuit. The first interface is an interface for a first sensor configured to detect a first physical quantity in a first detection axis, a second physical quantity in a second detection axis, and a third physical quantity in a third detection axis. The second sensor is configured to detect the physical quantity in the third detection axis as a high-accuracy third physical quantity with a higher accuracy than the first sensor. The processing circuit is configured to output the first physical quantity and the second physical quantity to the host via the host interface, and output the high-accuracy third physical quantity instead of the third physical quantity to the host via the host interface.

As described above, the inertial sensor device according to the present embodiment can output, via the host interface, the first physical quantity and the second physical quantity acquired from the first sensor and the high-accuracy third physical quantity acquired from the second sensor to the host. In this way, the host can acquire the high-accuracy third physical quantity instead of the third physical quantity without changing the specification on a host side.

The third physical quantity and the high-accuracy third physical quantity may be angular velocities around the third detection axis.

In this way, the host can acquire the high-accuracy third angular velocity without changing the specification on the host side.

The third physical quantity and the high-accuracy third physical quantity may be accelerations in the third detection axis.

In this way, when an acceleration in a predetermined axis is required to be more accurate than accelerations in other axes, the host can acquire the high-accuracy third acceleration without changing the specification on the host side.

The processing circuit may perform a zero point correction on the first physical quantity, the second physical quantity, and the high-accuracy third physical quantity, and the host interface may output, to the host, the first physical quantity, the second physical quantity, and the high-accuracy third physical quantity which are obtained after the zero point correction.

In this way, a zero point changed due to a thermal influence or the like can be corrected. Accordingly, even after the inertial sensor device is surface-mounted on the substrate of the host, the host can acquire the appropriate first physical quantity, second physical quantity, and high-accuracy third physical quantity which are obtained after the correction.

The processing circuit may perform an alignment correction between detection axes on the first physical quantity, the second physical quantity, and the high-accuracy third physical quantity, and the host interface may output, to the host, the first physical quantity, the second physical quantity, and the high-accuracy third physical quantity which are obtained after the alignment correction.

In this way, an alignment between the detection axes changed due to the thermal influence or the like can be corrected. Accordingly, even after the inertial sensor device is surface-mounted on the host, the host can acquire the appropriate first physical quantity, second physical quantity, and high-accuracy third physical quantity which are obtained after the correction.

The first sensor may be an MEMS inertial sensor, and the second sensor may be a crystal inertial sensor.

In this way, the physical quantity sensor that achieves both size reduction and high accuracy can be provided.

The sensor module according to the present embodiment relates to a sensor module including the inertial sensor device described above and the first sensor described above.

Although the present embodiment has been described in detail above, it will be easily understood by those skilled in the art that many modifications can be made without substantially departing from the novel matters and effects of the present disclosure. Accordingly, such modifications are intended to be included in the scope of the present disclosure. For example, a term described at least once together with a different term having a broader meaning or the same meaning in the description or the drawings can be replaced with the different term in any place in the description or the drawings. All combinations of the present embodiment and the modifications are also included in the scope of the present disclosure. The configuration, operation, and the like of the inertial sensor device or the sensor module are not limited to those described in the present embodiment, and various modifications can be made.

What is claimed is:

1. An inertial sensor device comprising:
   a first package;
   a first interface housed in the first package, the first interface being configured to perform first data communication with a first angular velocity sensor, the first angular velocity sensor being configured to detect a first angular velocity around a first detection axis along a front-rear direction of a moving object, a second angular velocity around a second detection axis along a left-right direction of the moving object, and a third angular velocity around a third detection axis along a gravity direction of the moving object;
   a second angular velocity sensor housed in the first package, the second angular velocity sensor being configured to detect an angular velocity around the third detection axis as a high-accuracy third angular velocity with a higher accuracy than the first angular velocity sensor;
   a second interface housed in the first package, the second interface being configured to perform second data communication with the second angular velocity sensor;
   a host interface housed in the first package, the host interface being configured to perform third data communication with a host; and
   a processing circuit housed in the first package, the processing circuit being configured to:
   output the first angular velocity and the second angular velocity to the host via the host interface; and
   output the high-accuracy third angular velocity instead of the third angular velocity to the host via the host interface,
   wherein the first angular velocity sensor is provided at an external location of the first package,
   the first angular velocity sensor is a MEMS inertial sensor, and
   the second angular velocity sensor is a crystal inertial sensor.

2. The inertial sensor device according to claim 1, wherein
   the processing circuit is configured to perform a zero point correction on the first angular velocity, the second angular velocity, and the high-accuracy third angular velocity, and
   the host interface is configured to output, to the host, the first angular velocity, the second angular velocity, and the high-accuracy third angular velocity which are obtained after the zero point correction.

3. The inertial sensor device according to claim 1, wherein the processing circuit is configured to perform an alignment correction between the first, second, and third detection axes on the first angular velocity, the second angular velocity, and the high-accuracy third angular velocity, and
the host interface is configured to output, to the host, the first angular velocity, the second angular velocity, and the high-accuracy third angular velocity which are obtained after the alignment correction.

4. A sensor module comprising:
a first angular velocity sensor configured to detect a first angular velocity around a first detection axis along a front-rear direction of a moving object, a second angular velocity around a second detection axis along a left-right direction of the moving object, and a third angular velocity around a third detection axis along a gravity direction of the moving object; and
an inertial sensor device, the inertial sensor device including:
　a first package;
　a first interface housed in the first package, the first interface being configured to perform first data communication with the first angular velocity sensor;
　a second angular velocity sensor housed in the first package, the second angular velocity sensor being configured to detect an angular velocity around the third detection axis as a high-accuracy third angular velocity with a higher accuracy than the first angular velocity sensor;
　a second interface housed in the first package, the second interface being configured to perform second data communication with the second angular velocity sensor;
　a host interface housed in the first package, the host interface being configured to perform third data communication with a host; and
　a processing circuit housed in the first package, the processing circuit being configured to:
　　output the first angular velocity and the second angular velocity to the host via the host interface; and
　　output the high-accuracy third angular velocity instead of the third angular velocity to the host via the host interface,
wherein the first angular velocity sensor is housed in a second package that is different from the first package,
the first angular velocity sensor is a MEMS inertial sensor, and
the second angular velocity sensor is a crystal inertial sensor.

* * * * *